United States Patent [19]

Kano et al.

[11] 4,452,483

[45] Jun. 5, 1984

[54] AUTOMOBILE ROOF STRUCTURE

[75] Inventors: Hisae Kano, Tokyo; Hideo Suzuki; Hideo Nakao, both of Tochigi, all of Japan

[73] Assignee: Nissan Motor Company, Limited, Yokohama, Japan

[21] Appl. No.: 362,076

[22] Filed: Mar. 26, 1982

[30] Foreign Application Priority Data

Apr. 1, 1981 [JP] Japan .................................. 56-49211

[51] Int. Cl.³ ............................................ B62D 25/06
[52] U.S. Cl. ............................................ 296/213
[58] Field of Search ........................... 296/213, 210

[56] References Cited

U.S. PATENT DOCUMENTS

| 2,205,797 | 6/1940 | Ledwinka | 296/213 |
| 3,298,734 | 1/1967 | Barenyi | 296/210 |
| 3,550,950 | 12/1970 | Pollock | 296/213 |
| 3,666,316 | 5/1972 | Wilfert | 296/213 |
| 3,935,353 | 1/1976 | Doerfling | 296/210 |
| 4,266,824 | 5/1981 | Inamota | 296/210 |

FOREIGN PATENT DOCUMENTS

| 1598548 | 8/1970 | France . | |
| 55-119522 | 9/1980 | Japan | 296/213 |

Primary Examiner—Robert R. Song
Attorney, Agent, or Firm—Schwartz, Jeffery, Schwaab, Mack, Blumenthal & Koch

[57] ABSTRACT

A structure for attaching a drip moulding to a roof panel of an automotive vehicle, includes a clip made of a resin. A drip moulding is attached by way of the clip to a flange of the roof panel at a side edge of the roof panel. The flange is upwardly bent to form a drip channel. A roof side rail outer panel is joined to the roof panel by spot-welding means and formed with an attaching hole in which the clip is inserted to be fixedly attached.

8 Claims, 3 Drawing Figures

AUTOMOBILE ROOF STRUCTURE

BACKGROUND OF THE INVENTION

The invention relates to an improved structure of attaching a drip moulding to a roof of an automotive vehicle.

FIG. 1 shows a prior art structure in which a drip moulding is attached to a roof of an automotive vehicle. A roof panel 1 has a flange 1a at its side edge. A roof side rail outer panel 2 is fixed with a separate drip channel member 4 by spot welding means. The flange 1a of the roof panel 1 is spot-welded to the drip channel member 4. A drip moulding 5 is attached at the outer end of the drip channel member 4.

In such a conventional structure, however, there are two spot-welded portions: One between the roof side rail outer member 2 and the drip channel member 4, and the other between drip channel member 4 and the roof panel flange 1a. Two joint portions 6, 7 between those members must be covered by sealing elements 8 to seal the joint portions 6, 7. Thus, a large number of assembling steps are required.

If the drip moulding 5 is made of a metal, because it directly contacts the drip channel 4, the coating on the outer end portion of the drip channel member 4 is apt to be broken to cause rust thereon.

Usually the roof side rail outer member 2, the drip channel member 4 and the roof panel 1 are not exactly uniform in shape or configuration due to manufacturing errors. Also, the gap G between the upper end of the drip moulding 5 and the roof panel 1 may vary due to an assembling error so that it is difficult in practice to obtain the same gap in every vehicle. Design is limited for such a reason, and the appearance and quality of the vehicles are thus adversely affected.

In FIG. 1, 9 designates a door sash, 10 a door weather strip, and 11 a door glass.

SUMMARY OF THE INVENTION

According to the invention, a structure for attaching a drip moulding to a roof panel of an automotive vehicle, includes a clip made of resin. A drip moulding is attached by way of the clip to a flange of the roof panel at a side edge of the roof panel. The flange is upwardly bent to form a drip channel. A roof side rail outer panel is joined to the roof panel by spot-welding means and formed with an attaching hole in which the clip is inserted to be fixedly attached.

The number of assembling steps can be decreased when the roof drip channel is formed. For instance, one welding step can be omitted. Workability can be improved. The coating on the roof panel at the roof drip channel can be prevented from being broken when the drip moulding is attached. Therefore, no rust problems occur. A uniform gap between the upper end of the drip moulding and the roof panel can be easily obtained so that car design becomes more flexible. Vehicle appearance and quality can be easily improved.

BRIEF DESCRIPTION OF THE DRAWINGS

The foregoing objects and advantages and other more specific objects will be evident when proceeding through the following detailed description of an illustrated embodiment of the invention, particularly when considered in connection with the accompanying drawings in which.

DESCRIPTION OF THE PREFERRED EMBODIMENT

Figure 1:
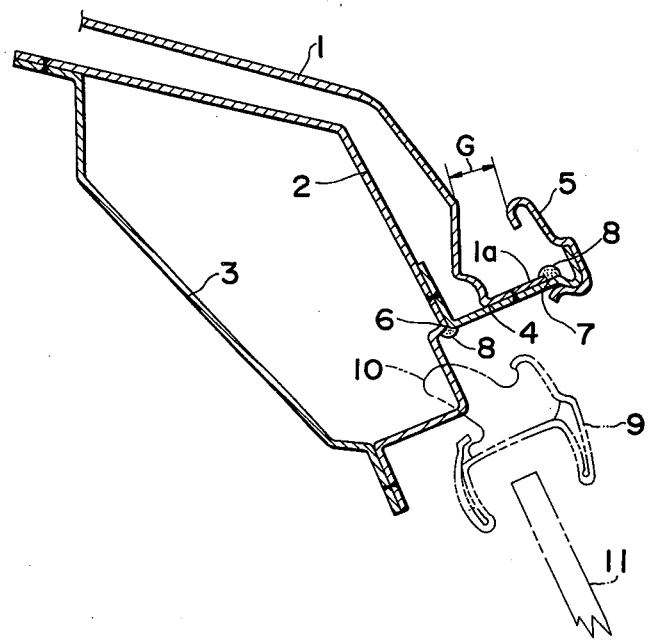
FIG. 1 is a sectional view showing a conventional structure for attaching a drip moulding to a roof panel of an automotive vehicle.
Figure 3:
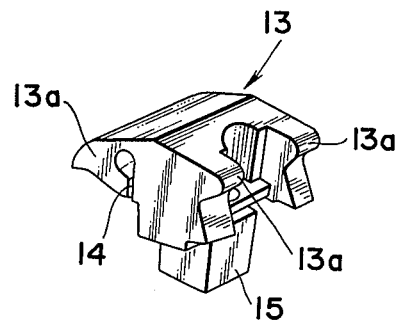
FIG. 3 is a perspective view showing a clip made of resin which is used in the structure shown in FIG. 2.
Figure 2:
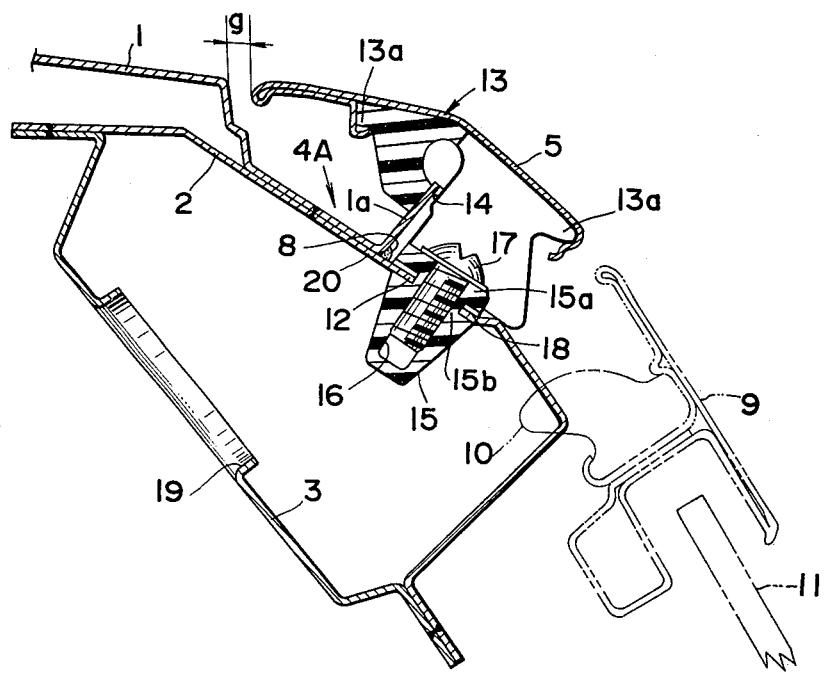
FIG. 2 is a sectional view showing a structure for attaching a drip moulding to a roof panel of an automotive vehicle according to a preferred embodiment of the invention.

Like reference characters designate like or corresponding parts or members through FIGS. 1 to 3.

Referring now to FIGS. 2 and 3, a roof panel 1 is directly fixed at its side edge to a roof side rail outer panel 2, for instance, by spot weling means. A flange 1a of the roof panel 1 is bent outwardly at about a right angle with respect to the roof side rail outer panel 2 to form a drip channel 4A. A suitable number of attaching holes 12 are formed in the roof side rail outer panel 2 along the flange 1a or the drip channel 4A.

A clip 13 is made of resin. The clip 13 has a flange-receiving groove 14 and a snap portion 15. The flange-receiving groove 14 is used to receive the flange 1a of the roof panel 1 therein as shown in FIG. 2. The snap portion 15 is inserted into each attaching hole 12 of the roof side rail outer panel 2 to be fixed thereat. A hole 16 receiving a screw is formed in the snap portion 15 at its central portion in its longitudinal direction. After the snap portion 15 is inserted into the attaching hole 12, a tapping screw 17 is screwed into hole 16 so as to secure the snap portion 15 into the attaching hole 12. In this condition, the resiliency of the clip 13 is abated in the transverse direction thereof.

A packing 18 is disposed between the base 15a of the snap portion 15 and the attaching hole 12 so as to ensure sealing therebetween.

The attaching hole 12 has a larger diameter than the neck portion 15b of the snap portion 15. Thus, even if the roof panel 1 is assembled with the roof side rail outer panel 2 with some error in dimension, such error can be absorbed by the snap portion 15 of the clip 13 within the attaching hole 12 so that the clip 13 can be adjusted in the assembling process with respect to the flange 1a of the roof panel 1.

A drip moulding 5 engages the upper and lower jaw portions 13a, 13a of the clip 13 to be fixed thereat thereby to constitute a roof drip.

In FIG. 2, 19 designates a hole formed in a roof side rail inner panel 3 for the purpose of assembling operations.

According to the above-mentioned embodiment of the invention, in order to form a roof drip channel, only one portion is spot-welded between the roof panel 1 and the roof side rail outer panel 2. Also, a sealing material 8 is used at only one joint portion 20 between the roof panel 1 and the roof side rail outer panel 2. Accordingly, the assembly can be remarkably improved.

As the drip moulding 5 is attached to the roof panel 1 and particularly its flange 1a by way of the clip 13, a uniform gap between the roof panel 1 and the upper edge of the drip moulding 5 can be easily obtained. Thus, car design is not limited in this respect. Also, vehicle appearance and quality can be improved.

Because the drip moulding 5 is attached through the resin clip 13 to the flange 1a forming the drip channel 4A so that the drip moulding 5 does not directly contact the flange 1a, even if the drip moulding 5 is made of a metal, no rust problems occur.

In the illustrated embodiment of the invention, the door sash 9, the drip moulding 5 and the roof panel 1 can be formed such that their outer surfaces are joined with a smooth curve whereby air-resistance characteristics thereof can be improved.

What is claimed is:

1. A structure for attaching a drip moulding to a roof panel of an automotive vehicle, comprising:
    the roof panel having a flange at a side edge thereof;
    a roof side rail outer panel joined to the roof panel at a side edge portion of the roof panel;
    the flange of the roof panel being bent upwardly to form a drip channel;
    a clip made of resin and having a flange-receiving groove, a snap portion and holding portions;
    the flange-receiving groove receiving and engaging the flange of the roof panel;
    the roof side rail outer panel having an attaching hole formed therein;
    the snap portion of the clip being inserted into the attaching hole of the roof side rail outer panel so that the clip is fixedly attached to the roof side rail outer panel;
    said holding portions securing the drip moulding to the clip whereby the drip moulding is indirectly attached to the flange of the roof panel.

2. The structure of claim 1, wherein the roof panel is spot-welded to the roof side rail outer panel.

3. The structure of claim 1, wherein the flange of the roof panel is bent outwardly at a right angle with respect to the roof side rail outer panel.

4. The structure of claim 1, wherein a plurality of attaching holes are formed in the roof side rail outer panel along the flange and the clip is attached in each of the attaching holes.

5. The structure of claim 1, wherein the snap portion of the clip is formed with a screw-receiving hole screwing a tapping screw for attaching of the clip to the roof side rail outer panel.

6. The structure of claim 1, wherein the snap portion has a neck portion having an outer diameter which is smaller than the diameter of the attaching hole of the roof side rail outer panel.

7. The structure of claim 1, wherein said holding portions include two jaws portions which the drip moulding engages to be attached to the clip.

8. The structure of claim 1, wherein the outer surface of the drip moulding and the roof panel constitutes a smooth curve.

* * * * *